United States Patent
Guering

(10) Patent No.: US 9,016,279 B2
(45) Date of Patent: Apr. 28, 2015

(54) OXYGEN SUPPLY SYSTEM INTENDED IN PARTICULAR FOR THE FLIGHT CREW OF AN AIRCRAFT

(75) Inventor: Bernard Guering, Montrabe (FR)

(73) Assignee: AIRBUS Operations S.A.S., Toulouse (FR)

(*) Notice: Subject to any disclaimer, the term of this patent is extended or adjusted under 35 U.S.C. 154(b) by 554 days.

(21) Appl. No.: 13/372,959

(22) Filed: Feb. 14, 2012

(65) Prior Publication Data

US 2013/0160768 A1     Jun. 27, 2013

(30) Foreign Application Priority Data

Feb. 18, 2011 (FR) ...................................... 11 00496

(51) Int. Cl.
*A61M 16/06* (2006.01)
*A62B 7/02* (2006.01)
(Continued)

(52) U.S. Cl.
CPC .............. *B64D 11/0689* (2013.01); *A62B 7/00* (2013.01); *B64D 11/0646* (2014.12); *B60N 2/468* (2013.01); *B64D 11/0015* (2013.01);
(Continued)

(58) Field of Classification Search
CPC .............. A47C 7/62; A47C 1/12; A47C 1/00; A47C 3/02; A47C 31/00; A47C 7/72; A47C 7/54; A63J 23/00; A63J 23/02; A63J 1/00; G09B 9/16; G09B 9/02; G09B 9/10; G09B 9/22; G09B 9/32; A62B 7/14; A62B 7/00; A62B 25/00; A61G 5/00; A61G 5/10; B60N 3/18; B60N 2/48; B60N 3/00; B60N 2/46; B60N 2/56; B60N 2/468; F25D 3/00; F25D 3/06; F25D 17/04; F25D 17/06; F25D 23/12; B64D 11/00; B64D 13/00; B64D 10/00; B64D 11/06; B64D 11/0015; B64D 11/0629; B64D 11/0646; B60H 1/00; B60H 1/32
USPC ............ 128/200.24, 201.29, 202.11, 202.25, 128/202.27, 204.18, 204.21, 204.29, 128/205.24, 205.26; 244/1 R, 117 R, 118.5, 244/122 R, 122 A; 297/188.01, 188.04, 297/411.2, 411.45, 180.14, 217.3, 217.4; 472/59; 52/8

See application file for complete search history.

(56) References Cited

U.S. PATENT DOCUMENTS 3,628,829 A * 12/1971 Heilig .......................... 297/217.4
4,024,730 A * 5/1977 Bell et al. ...................... 62/259.3
(Continued)

FOREIGN PATENT DOCUMENTS

FR          2 753 170        3/1998
WO    WO 2005/047104 A2    5/2005

OTHER PUBLICATIONS

French Preliminary Search Report issued on Oct. 5, 2011 in corresponding French Application No. 11 00496 filed on Feb. 18, 2011 (with an English Translation of Categories).

Primary Examiner — Annette Dixon
(74) Attorney, Agent, or Firm — Oblon, McClelland, Maier & Neustadt, L.L.P.

(57) ABSTRACT

The system supplies oxygen for a flight crew member of an aircraft and has an oxygen source, an oxygen mask, and a circuit connecting the oxygen source to the oxygen mask. The system is integrated into an aircraft seat, which has at least one foot bearing a sitting surface and a back. The oxygen source may be a cylinder of gaseous oxygen under pressure. The oxygen mask can be housed in a compartment inside the sitting surface of the seat.

13 Claims, 4 Drawing Sheets

(51) Int. Cl.
*A62B 9/00* (2006.01)
*A62B 18/02* (2006.01)
*A47C 7/54* (2006.01)
*B64D 11/06* (2006.01)
*B64D 25/04* (2006.01)
*A62B 7/00* (2006.01)
*B60N 2/46* (2006.01)
*B64D 11/00* (2006.01)

(52) U.S. Cl.
CPC .. *A62B 9/00* (2013.01); *A62B 7/02* (2013.01); *A62B 18/02* (2013.01); *B64D 11/0629* (2014.12)

(56) References Cited

U.S. PATENT DOCUMENTS

| | | | | |
|---|---|---|---|---|
| 4,619,255 | A * | 10/1986 | Spinosa et al. | 128/202.27 |
| 5,154,374 | A | 10/1992 | Beroth | |
| 5,944,284 | A * | 8/1999 | Bardel | 244/118.5 |
| 5,954,052 | A * | 9/1999 | McDonald et al. | 128/206.27 |
| 5,984,415 | A | 11/1999 | Schumacher et al. | |
| 6,318,364 | B1 * | 11/2001 | Ford et al. | 128/204.18 |
| 7,077,465 | B1 * | 7/2006 | Calderon | 297/180.15 |
| 7,866,747 | B2 * | 1/2011 | Park | 297/217.4 |
| 2007/0193279 | A1 * | 8/2007 | Yoneno et al. | 62/3.3 |
| 2013/0160768 | A1 * | 6/2013 | Guering | 128/205.25 |

* cited by examiner

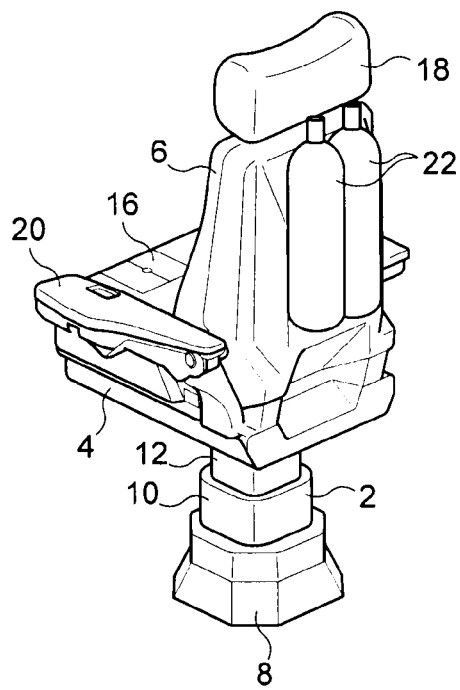
Fig. 1
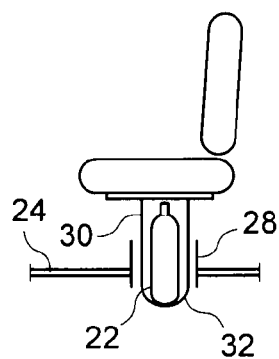 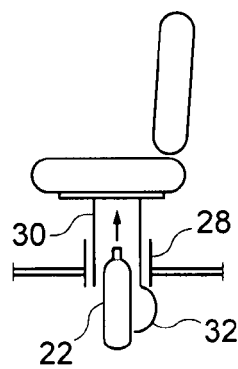 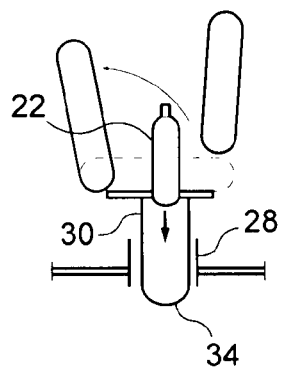 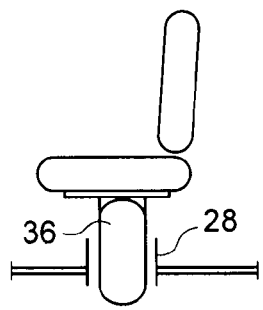
Fig. 2a    Fig. 2b    Fig. 2c    Fig. 2d
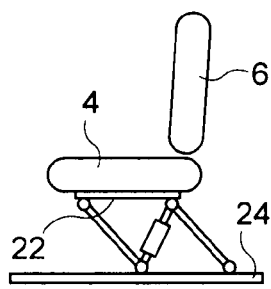
Fig. 3

OXYGEN SUPPLY SYSTEM INTENDED IN PARTICULAR FOR THE FLIGHT CREW OF AN AIRCRAFT

This invention relates to an oxygen supply device intended most particularly for an aircraft pilot or for the flight crew of an aircraft.

BACKGROUND

By aircraft pilot there will be understood here the pilot in addition to his copilot, as well as possibly any person participating in flying of an aircraft and who is seated in the flight deck to assist the pilot and/or the copilot in flying operations or functions linked to the specificities of the aircraft concerned. In the context of commercial flights, for transport of passengers or goods, there generally is a pilot and a copilot. In certain aircraft, more often than not military, a third man is required to be seated in the flight deck so as to take care of certain specific functions which may vary according to the flight missions of the aircraft.

An aircraft intended for transport of passengers generally comprises a cockpit in which a pilot and a copilot are seated and a cabin intended to accommodate the passengers. An oxygen mask supplied by a system is associated with each seat of the passenger cabin. There also is a system, sometimes independent of the system supplying the oxygen masks intended for the passengers, for the flight crew located in the cockpit of the aircraft. The system provided for the occupants of the cockpit consists mainly of one or more oxygen cylinders, oxygen masks and a circuit connecting the cylinders to the masks.

The oxygen cylinders sometimes are installed directly in the cockpit of the aircraft but more often than not in an electronics bay located beneath the flight deck. The oxygen masks are stowed close to the seats for the pilot and the copilot. They are found in particular in the side spaces to the right and to the left of the pilots, in the flight deck, these side spaces commonly being called "consoles." Thus an oxygen mask generally is found to the left of the pilot and to the right of the copilot. A circuit generally comprising both rigid ducts and flexible ducts makes it possible to ensure distribution of the oxygen to the occupants of the cockpit. This circuit also integrates components making it possible to adjust the flow and the pressure of the oxygen delivered to the oxygen masks.

Such an oxygen supply system is complex and as a result costly. As far as safety is concerned, it is advisable, for example, to protect the circuit and the oxygen cylinders from special risks that an aircraft may encounter during its flight (bird strikes, explosive risks, . . . ) that may lead to diverting the oxygen supply circuit. This system, of course, occupies a certain space and sometimes constitutes an obstacle for running of other piping.

BRIEF SUMMARY

This invention then has as a purpose to provide an oxygen supply system for a pilot, simplified in comparison with the known systems of the prior art. A system according to the invention will make it possible to provide oxygen to the pilot in complete safety under all flight conditions. This system preferably will have a lower cost price in comparison with the known systems of the prior art. It also preferably will be adaptable as well for any person traveling aboard an aircraft, in particular the passengers.

To this end, this invention proposes an oxygen supply system for an aircraft, comprising an oxygen source, an oxygen mask as well as a circuit connecting the oxygen source to the said oxygen mask.

According to this invention, the said system is integrated into an aircraft seat, the said seat comprising at least one foot bearing a sitting surface and a back, and the oxygen mask is housed in a compartment inside the sitting surface of the seat.

This solution allows the integration of an oxygen supply system into a seat. As a result, the circulation circuit for the gas is simplified. The complex circuit that is found on most conventional commercial aircraft disappears. Protection for the oxygen supply system also is resolved because the protection for this system, in the case of the invention, is taken care of by the security protection for the pilot, or more generally for the flight crew.

The oxygen source preferably comprises at least one cylinder of gaseous oxygen under pressure. It also may involve, for example, one (or more) cylinder(s) containing a reagent making it possible to produce oxygen.

In a supply system according to this invention, the oxygen source comprises, for example, an oxygen cylinder (or several cylinders) disposed at the rear of the back of the seat. This oxygen source may comprise, cumulatively or alternatively, an oxygen cylinder (or several) disposed in a horizontal position beneath the sitting surface of the seat and/or one (or more) oxygen cylinder(s) disposed vertically beneath the sitting surface of the seat.

This invention also relates to a seat, in particular a seat for an aircraft flight crew, characterized in that it integrates an oxygen supply system according to the invention.

A seat according to the invention may comprise a central foot in which a first tube bearing the sitting surface of the seat is installed sliding in a second tube, and in which the first tube contains at least one oxygen source. In this embodiment, it may be provided, for example, that the sitting surface of the seat is pivoting so as to allow an access to the oxygen source disposed in the first tube. The tube installed sliding possibly may be a tube that is brought to run across the floor on which the corresponding seat is fastened. It also may involve a telescopic foot with possibly more than two tubes.

In the case where the seat comprises a central foot in which a first tube bearing the sitting surface of the seat is installed sliding in a second tube, then the first tube may be configured so as to form a tank with gaseous oxygen under pressure.

An advantageous embodiment of a seat according to the invention provides that the compartment housing the oxygen mask is disposed in a central position at the front edge of the sitting surface opposite the back, a cover being provided to close off the said compartment. This position of the oxygen mask makes it possible to access it directly and intuitively. Since the mask generally (always) is connected to a cord enabling its supply with oxygen, the position suggested here makes it possible to have a relatively short cord. This has a dual advantage: on the one hand the stowage space for the mask and its cord may be reduced and on the other hand the cord is not bothersome, or at the very least is less bothersome, to the pilot when he is flying with the mask on his face.

Finally, this invention also relates to an aircraft, characterized in that it comprises an oxygen supply system such as described above.

BRIEF DESCRIPTION OF THE DRAWINGS

Details and advantages of this invention will become more apparent from the description that follows, presented with reference to the attached schematic drawings on which:

FIG. 1 shows a pilot seat equipped with an oxygen supply system according to this invention, FIGS. 2a-2d show different embodiment variants of the invention, FIG. 2a illustrating installation of an oxygen cylinder in a pilot seat foot, FIG. 2b illustrating installation of the oxygen cylinder of FIG. 2a from the bottom, FIG. 2c illustrating introduction of the oxygen cylinder of FIG. 2a from the top, and FIG. 2d illustrating an embodiment variant of FIG. 2a in which an oxygen source is integrated into the structure of a seat foot, FIG. 3 shows another embodiment variant in which an oxygen cylinder is located beneath the sitting surface of a pilot seat.

FIG. 1 shows an aircraft pilot seat intended to be installed on the floor of a cockpit. This seat comprises a column 2, a sitting surface 4 and a back 6.

DETAILED DESCRIPTION

Figure 4A:
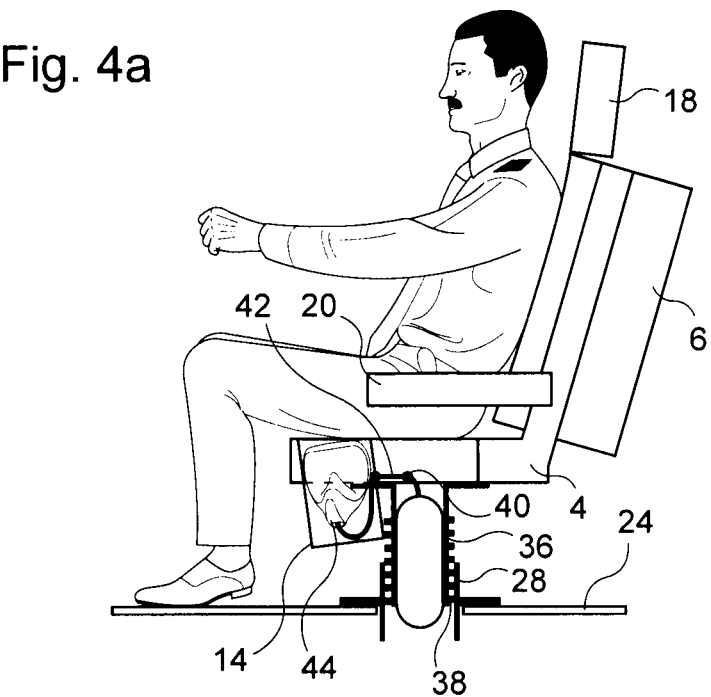
FIG. 4a is a schematic side view illustrating an oxygen supply system according to the invention when it is not being used.

Column 2 forms a central telescopic foot supporting the assembly made up of sitting surface 4 and back 6. It allows height adjustment of this assembly. In the embodiment shown, column 2 has a base 8 intended to be fastened onto the floor of the cockpit. This base, of overall more or less truncated shape, has at its top an opening in which a first tubular component 10 comes to slide. A second tubular component 12 in turn comes to slide in first tubular component 10. A rack-and-pinion system makes it possible each time to achieve positioning of first tubular component 10 in relation to base 8 and of second tubular component 12 in relation to first tubular component 10. Electric motors are used to make this adjustment. The individual skilled in the art is familiar with the structure of such a pilot seat column and this is not described in further detail here.

Sitting surface 4 is borne by second tubular component 12 of column 2. This sitting surface takes on the usual functionalities of a pilot seat sitting surface. In comparison with a sitting surface of the prior art, sitting surface 4, however, has a housing 14 closed off by a cover 16. This housing 14 and this cover 16 will be described in further detail with reference to FIGS. 6 to 8. It may already be noted, however, that this housing 14 is disposed so as to open into the upper face of sitting surface 4 and is located at the front of the said sitting surface 4.

Throughout this description, it is assumed that column 2 is oriented more or less vertically, that sitting surface 4 is located above column 2 and that back 6 is located at the rear of the described seat. A high/low and front/rear orientation thus is defined. For the right/left orientation, a pilot seated on the seat as shown, for example, on FIGS. 4 and 6, will be taken as reference.

Back 6 takes on a standard back structure of a pilot seat. It is connected in its lower part to the rear of sitting surface 4 and bears a headrest 18 on its upper part. It also bears an armrest 20, on both sides.

In the embodiment shown on FIG. 1, it is noted that two cylinders 22 are fastened onto back 6 of the seat. These cylinders 22 preferably are covered by a hood which has not been shown here so as to allow just cylinders 22 to appear. The latter constitute an oxygen source for the person who is seated on the seat.

FIGS. 2a-2d show an embodiment variant of the seat of FIG. 1 in which the foot of the seat is traversing. That means that column 2 of the seat may come to traverse the floor of the cockpit. An opening then is provided in the floor of the cockpit to allow passage of this column. This traversing structure is known to the individual skilled in the art and is shown only schematically on FIGS. 2a-2d.

In the embodiment of FIGS. 2a-2d, the structure of the seat comprises a base 28 of tubular structure which is installed in an opening implemented in floor 24 of the cockpit. A first tube 30 is installed sliding in tubular base 28. An electrically controlled rack-and-pinion system also may be provided in order to ensure height adjustment of the seat.

In this embodiment, it is proposed to come to house an oxygen source occurring in the embodiment shown in the form of an oxygen cylinder 22, inside first tube 30. FIG. 2a shows such a cylinder 22 housed in this first tube 30.

In this description, in all the embodiments, cylinder 22 is a cylinder of gaseous oxygen under pressure. Here it involves a cylinder containing dioxygen, in contrast with existing devices in which a reagent making it possible to produce oxygen is provided. A gaseous oxygen cylinder, such as that used in this description, makes it possible in particular to ensure a greater autonomy. Another oxygen source, of a different type, however, may be considered in all the embodiments described.

FIG. 2b illustrates the installation of a cylinder 22 in first tube 30 of column 2 of the seat of FIG. 2a. It is proposed here to introduce cylinder 22 from a technical area, called avionics bay, disposed beneath the cockpit in which the seat is installed.

In this embodiment variant (FIGS. 2a-2d), it may be provided that the lower part of first tube 30 is closed off by a cover 32 installed pivoting on first tube 30 so as to allow introduction of cylinder 22 from the bottom and also to serve as support for the said cylinder 22 when it is in place in first tube 30.

In the embodiment variant of FIG. 2c, it is proposed to introduce cylinder 22 from the top. In order to do so, sitting surface 4 is installed pivoting. In the embodiment shown, it was assumed that sitting surface 4 was able to pivot around a more or less horizontal transverse axis, that is to say more or less parallel to back 6. A pivoting also could be provided, however, according to another axis, preferably horizontal, but which for example could be longitudinal (more or less parallel to one of the armrests, for example). On FIG. 2c, sitting surface 4 lifts up, moving away from back 6. It also could be provided that sitting surface 4 lifts up against back 6.

Once the sitting surface is lifted up, first tube 30 is accessible from the top. It then is possible to introduce, or remove, a cylinder 22. In this embodiment, it is provided that the first tube is closed off in its lower part by a bottom 34.

The embodiment of FIG. 2d provides that the first tube of FIG. 2a and the oxygen cylinder form only one component.

There thus is a tank 36 that fulfills both the structural function of first tube 30 by bearing sitting surface 4 of the seat and sliding in base 28 and the cylinder function, because it contains gaseous oxygen. This technical solution has at least two advantages. A first advantage is that the assembly of the equipped seat is lighter as a whole, because the structure of the seat accomplishes both the function of column structure and the function of oxygen tank. Then, tank 36, for similar outside dimensions, will be able to contain more oxygen than a first tube 30 into which a cylinder 22 is introduced. Autonomy therefore is enhanced while minimizing the weight of the assembly.

FIG. 3 illustrates, on the one hand, another seat structure and, on the other hand, another possible positioning for a cylinder 22.

The seat structure shown according to FIG. 3 also is known to the individual skilled in the art. Here it involves a parallelogram seat. It is noted here that the base of the seat forms a deformable parallelogram making it possible, for example, to adjust the height of the seat.

In this embodiment it is proposed to dispose at least one cylinder 22 beneath sitting surface 4 of the seat. These cylinders may be disposed longitudinally as shown on FIG. 3, but it also is possible to dispose one or more cylinders crosswise.

FIG. 4a is based on the embodiment of FIG. 2d. Here again there is found a tank 36 which serves both to contain the gaseous dioxygen and as a support for the seat. A rack-and-pinion gear 38 is shown here at the front and at the rear of tank 36. At the top of tank 36 is a regulating valve 40 that allows opening and closing of tank 36 and also makes it possible to regulate the gaseous flow leaving this tank 36. This regulating valve 40 is connected to a circuit 42 making it possible to convey the gas located in tank 36 to an oxygen mask 44 visible on FIG. 4b.

Under normal flight conditions, oxygen mask 44 is stowed in its housing 14. Regulating valve 40 then is closed. In the event of depressurization in the cockpit, the pilot grabs the oxygen mask, places it over his face and activates opening of valve 40.

Figure 4B:
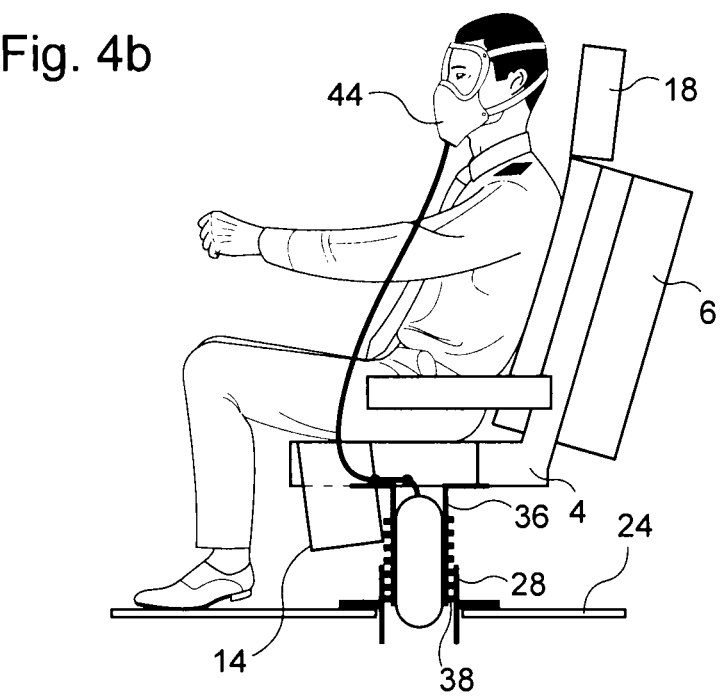
FIG. 4b is a view similar to FIG. 4a, the oxygen supply system being used by a pilot.
Figure 5:
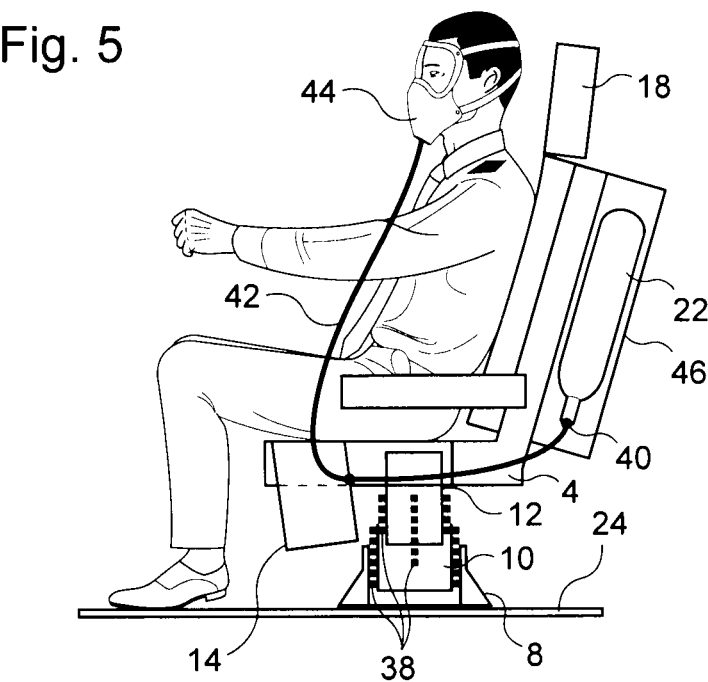
FIG. 5 is a view corresponding to FIG. 4b for an embodiment variant of an oxygen supply system according to this invention.

FIG. 5 is a Figure similar to FIG. 4b for an embodiment variant similar to the embodiment of FIG. 1. Here, rack-and-pinion gears 38 are shown schematically and there also is seen a hood 46 which comes to cover oxygen cylinders 22 located behind back 6.

Figure 6:
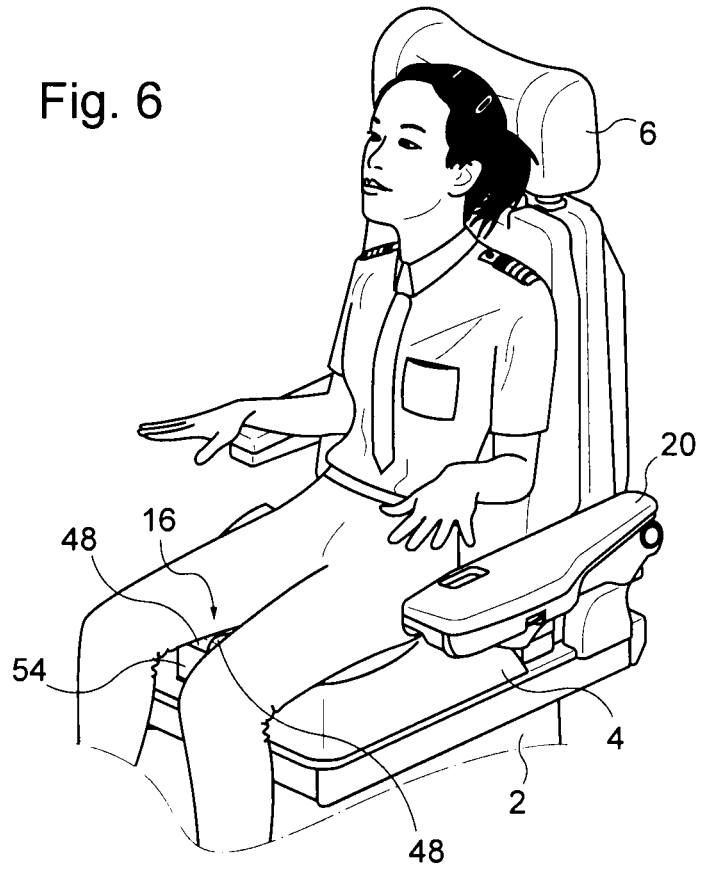
FIG. 6 illustrates an oxygen mask housing in closed position, FIG. 7 schematically shows a seat sitting surface equipped with an oxygen mask housing for an oxygen supply system according to this invention.
Figure 7:
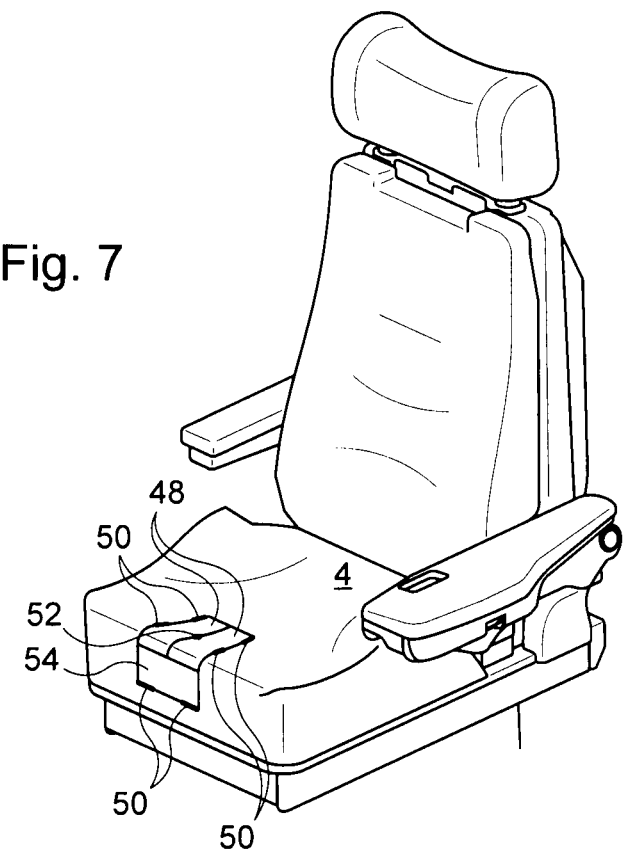
Figure 8:
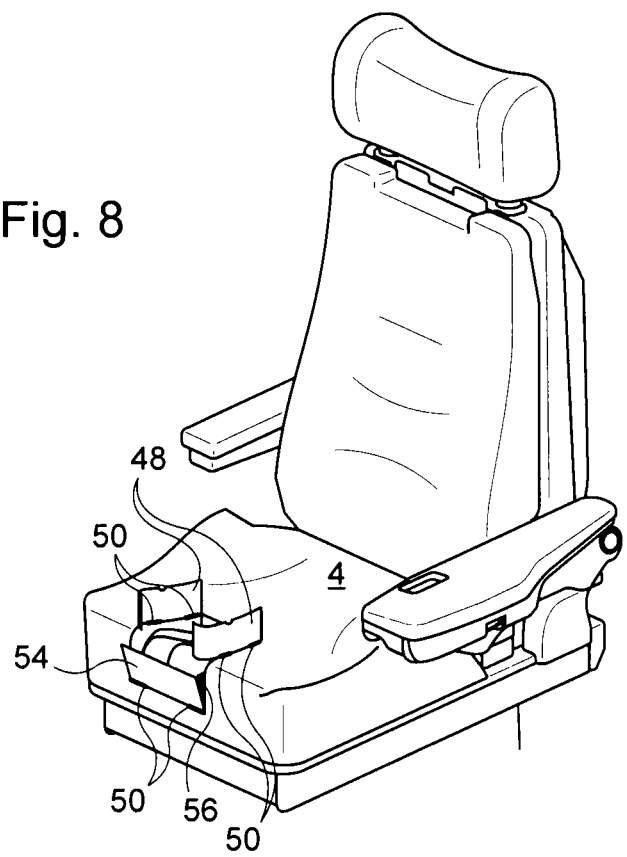
FIG. 8 shows the oxygen mask housing of FIG. 7 in open position.

FIGS. 6 to 8 illustrate more specifically housing 14 accommodating oxygen mask 44.

As already mentioned, housing 14 is located at the front of sitting surface 4, opens onto the upper face thereof and is placed in median position. As illustrated on FIG. 6, when a pilot is seated on the corresponding seat, this position of housing 14 thus is located just beneath his thighs and between them. It therefore involves a place very easily accessible for the user. The thighs of the user no longer fall on this part of sitting surface 4. As a result, the comfort of the user is not impaired. He is not bothered by the "lack" of foam rubber in the seat at this level.

FIGS. 7 and 8 illustrate the manner in which housing 14 is closed and may be opened.

FIG. 7 shows that the opening of housing 14 in the upper face of sitting surface 4 of the seat is more or less rectangular or trapezoid. It thus has two more or less longitudinal edges and two more or less transverse edges. Cover 16 here has two flaps 48. Each of these flaps 48 is jointed on two hinges 50 disposed along the longitudinal edges of the opening of housing 14 at the upper face of sitting surface 4. The joining between flaps 48 defines a more or less longitudinal joining line. A circular opening 52 intended to facilitate opening of the said flaps 48 is implemented at this joining line. In fact, the user may insert a finger into opening 52 and in this way easily pick up a flap 48 to open it. He then has access to oxygen mask 44 located in housing 14. By pulling thereon, second flap 48, if it was not already open, then opens up.

In order to facilitate removal of oxygen mask 44 from its housing 14, it is provided to joint a transverse face 54 of housing 14. This transverse face 54 forms the extension of the more or less vertical front edge of sitting surface 4 of the seat.

It is proposed to joint this transverse face 54 in relation to hinges 50 oriented horizontally and transversely on the lower edge of transverse face 54. In the proposed embodiment, bellows 56 connect the left and right edges of transverse face 54 to the front face of sitting surface 4.

It may be provided that flaps 48 in their closed position come to hold transverse face 54 in its closed position. It is only when flaps 48 are open that transverse face 54 in turn may be opened. The opening of the housing then is enlarged as illustrated on FIG. 8, which facilitates removal of oxygen mask 44 from housing 14.

The oxygen supply system such as described here for a pilot seat of course also may be applied to a copilot, or even to any seat intended to accommodate a member of the flight crew and/or any seat located in the cockpit of an aircraft. In this way, the use of an autonomous oxygen supply system such as described above makes it possible to simplify the design of a nose cone of an aircraft intended for transport of passengers and/or goods. This system is intended first of all for such aircraft. Its use on fighter planes is not contemplated.

The invention also may be applied to seats intended to accommodate passengers of a commercial aircraft. A seat according to this invention then also may be placed in an aircraft cabin.

The fact of integrating the oxygen supply system into a seat minimizes the mass and complexity of the oxygen supply circuit. The risks of impact at the circuit are practically non-existent and the circuit therefore does not need to be specially protected. This invention thus proposes an autonomous integration of the oxygen system onto a seat, such as a pilot seat, for example. The various components preferably are disposed in non-functional zones of the seat. The oxygen mask thus is integrated between the legs, and beneath same, of the user. The cylinders (or more generally the oxygen sources) also are placed in a zone not previously occupied. The invention may be adapted here to the different typologies of seats as shown by the various examples illustrated on the drawings attached to this description. It should be noted that these drawings are not an exhaustive illustration of the types of seats that may accommodate an oxygen supply system according to this invention.

In an advantageous embodiment, an oxygen tank is integrated into the actual structure of the seat.

Integration of an oxygen supply system into a seat also makes it possible to facilitate final assembly of the aircraft. The impact of installation of the oxygen supply system for the pilot thus is eased because this oxygen supply system is implemented during the installation operation for the seat. The interactions with the other installation operations in the cockpit of the aircraft therefore are minimized.

In the embodiments described above, it is provided to have an autonomous system for each seat. It may be planned, however, to provide a connection at the oxygen ducts between the seat for a pilot and the seat for a copilot. This makes it possible to share the two oxygen tanks of their respective seats for the pilot and the copilot. Such a connection also may be considered, for example, between passenger seats of the same row, not separated by an aisle.

The proposed positioning of the oxygen mask allows a direct and intuitive access thereto. This oxygen mask is in contact with the oxygen tank for example through an extensible cord. The user therefore easily may position the oxygen mask over his face. The position chosen for storing the oxygen mask also is advantageous because the cord connected to the oxygen mask may be relatively short. This cord then does not bother the pilot during his work when he is wearing the said oxygen mask.

This invention is not limited to the embodiments described above by way of non-limitative examples and to the variants cited. It also relates to all the embodiment variants within the capacity of the individual skilled in the art in the context of the claims below.

The invention claimed is:

1. An oxygen supply system for an aircraft, comprising:
   an oxygen source;
   an oxygen mask; and
   a circuit connecting the oxygen source to said oxygen mask,
   wherein said oxygen supply system is integrated into an aircraft seat, said seat including at least one foot bearing a sitting surface and a back, and
   wherein said oxygen mask is housed in a compartment inside the sitting surface of said seat.

2. The oxygen supply system according to claim 1, wherein said oxygen source includes an oxygen cylinder disposed at the rear of said seat.

3. The oxygen supply system according to claim 1, wherein said oxygen source includes an oxygen cylinder disposed in a horizontal position beneath the sitting surface of said seat.

4. The oxygen supply system according to claim 1, wherein said oxygen source includes an oxygen cylinder disposed vertically beneath the sitting surface of said seat.

5. The oxygen supply system according to one of claims 1 to 4, further comprising said seat.

6. The oxygen supply system according to claim 1, further comprising said seat,
   wherein the at least one foot is a central foot having a first tube bearing the sitting surface of said seat, which is installed sliding in a second tube, the first tube containing said oxygen source.

7. The oxygen supply system according to claim 1, further comprising said seat,
   wherein the sitting surface of said seat is configured to pivot so as to allow access to said oxygen source contained in the first tube.

8. The oxygen supply system according to claim 1, further comprising said seat,
   wherein the at least one foot is a central foot having a first tube bearing the sitting surface of said seat, which is installed sliding in a second tube, the first tube being configured to form a tank for gaseous oxygen under pressure as a portion of said oxygen source.

9. The oxygen supply system according to claim 1, wherein said compartment housing said oxygen mask is disposed in a central position of the sitting surface, at a front edge of the sitting surface opposite the back, a cover being provided to close off said compartment.

10. An aircraft comprising said oxygen supply system according to one of claims 1 to 4.

11. The oxygen supply system according to claim 1,
    wherein said compartment is disposed in a center position of the sitting surface, at a front edge of the sitting surface, and
    wherein a cover provides access to said compartment, the cover being disposed at the center position but spaced apart from both side edges of the sitting surface, the cover being provided at the front edge of the sitting surface and having a portion thereof that forms a portion of the sitting surface.

12. The oxygen supply system according to claim 11, wherein the cover is a multi-part cover, at least one portion of which is openable to provide access to said compartment and closable to prevent access to said compartment.

13. An oxygen supply system for an aircraft, comprising:
    an oxygen source;
    an oxygen mask;
    circuitry connecting said oxygen source to said oxygen mask; and
    a seat including a base bearing a sitting surface and a back, the base having an accessible compartment,
    wherein said oxygen supply system is integrated into said seat, and
    wherein said oxygen mask is housable in the accessible compartment of the base of said seat, the accessible compartment being beneath the sitting surface of the base.

* * * * *